(12) United States Patent
Wang

(10) Patent No.: US 11,815,737 B1
(45) Date of Patent: Nov. 14, 2023

(54) NIGHT VISION BINOCULARS WITH REPLACEABLE OBJECTIVE LENS

(71) Applicant: Shenzhen Oneleaf Technology Co., Ltd., Shenzhen (CN)

(72) Inventor: Peng Wang, Shenzhen (CN)

(*) Notice: Subject to any disclaimer, the term of this patent is extended or adjusted under 35 U.S.C. 154(b) by 0 days.

(21) Appl. No.: 18/177,874

(22) Filed: Mar. 3, 2023

(30) Foreign Application Priority Data

Feb. 3, 2023 (CN) .......................... 202320232125.1

(51) Int. Cl.
  *G02B 7/14* (2021.01)
  *G02B 7/06* (2021.01)
  *F41G 1/32* (2006.01)

(52) U.S. Cl.
  CPC ............. *G02B 7/14* (2013.01); *F41G 1/32* (2013.01); *G02B 7/06* (2013.01)

(58) Field of Classification Search
  CPC .......... G02B 7/06; G02B 7/1824; G02B 7/20; G02B 7/16; G02B 7/14; G02B 7/026; G02B 7/023; G02B 7/022; G02B 7/021; G02B 7/02; G02B 7/00
  See application file for complete search history.

(56) References Cited

U.S. PATENT DOCUMENTS

| 2005/0062873 | A1* | 3/2005 | Brough | ............ G02B 7/14 348/E5.09 |
| 2009/0141371 | A1* | 6/2009 | Brown | ............ G02B 7/026 359/811 |
| 2010/0264310 | A1* | 10/2010 | Willey | ............ G02B 23/12 250/330 |
| 2014/0226213 | A1* | 8/2014 | Fathalipour | ........ G02B 27/0149 359/630 |

* cited by examiner

*Primary Examiner* — Christopher Stanford
*Assistant Examiner* — Journey F Sumlar

(57) ABSTRACT

The present disclosure provides night vision binoculars with a replaceable objective lens. The night vision binoculars include: a main body, an objective lens and a locking member. The main body is provided with a mounting base; the objective lens is provided with a locking hole and detachably inserted into the mounting base. The objective lens rotates in the mounting base; and the locking member is slidingly disposed on the main body and provided with a locking position and an unlocking position. When the locking member is in the locking position, the locking member is inserted into the locking hole; and when the locking member is in the unlocking position. The objective lens can be removed from the mounting base. Through the above structure setting, the user is convenient to disassemble the objective lens; and the night vision binoculars are simple in structure and convenient to use.

19 Claims, 13 Drawing Sheets

NIGHT VISION BINOCULARS WITH REPLACEABLE OBJECTIVE LENS

CROSS-REFERENCE TO RELATED APPLICATIONS

The application claims priority of Chinese patent application 2023202321251, filed on 2023 Feb. 3, which is incorporated herein by reference in its entireties.

TECHNICAL FIELD

The present disclosure relates to the technical field of night vision binoculars, in particular to night vision binoculars with a replaceable objective lens.

BACKGROUND

As an optical instrument which can magnify a distant object by using refraction or reflection of light and observe the object through an eyepiece, night vision binoculars are widely used to observe a terrain, scout an enemy's situation, roughly measure a direction angle, an elevation, a deviation of point of impact and the like of an object distance, and the night vision binoculars are also used for tourism, viewing, watching, etc., so the night vision binoculars play an important role in people's life.

For the existing night vision binoculars on the market, usually, the eyepiece and an objective lens are fixedly connected to a night vision binoculars main body, and a focal length is adjusted by adjusting a focusing ring, so as to observe objects with different distances. However, the night vision binoculars have certain problems, the type of the objective lens cannot be replaced according to different demands, and the product has poor adaptability.

Therefore, the present disclosure provides night vision binoculars with a replaceable objective lens, which can solve the above problem effectively; and the night vision binoculars have a simple structure, and the objective lens is convenient to assemble and disassemble.

SUMMARY

In order to overcome deficiencies of the prior art, the present disclosure provides night vision binoculars with a replaceable objective lens; and the night vision binoculars have a simple structure, and the objective lens is convenient to assemble and disassemble.

The technical solution adopted by the present disclosure to solve the technical problem is as follows: night vision binoculars with replaceable objective lens including a main body, which is provided with a mounting base; an objective lens, which is provided with a locking hole and detachably inserted into the mounting base, and the objective lens rotates in the mounting base; and a locking member, which is slidingly disposed on the main body and provided with a locking position and an unlocking position; when the locking member is in the locking position, the locking member is inserted into the locking hole; and when the locking member is in the unlocking position, the objective lens moves in relative to the mounting base.

As the improvement of the present disclosure, the objective lens is provided with a sliding rail and a plug-in opening, the plug-in opening communicates with the sliding rail, the mounting base is provided with a limiting bump, the limiting bump is inserted into the sliding rail along the plug-in opening and slides in the sliding rail, and the limiting bump resists to a side wall of the sliding rail.

As the improvement of the present disclosure, the objective lens is provided with an inserting position and a mounting position; when the objective lens is in the inserting position, the limiting bump is inserted or pulled out along the plug-in opening; and when the objective lens rotates to the mounting position, the limiting bump resists to the side wall of the sliding rail, a locking member is located in a locking position, and the locking member is inserted into the locking hole.

As the improvement of the present disclosure, the locking member includes an inserting part, a sliding part and an elastic member; a sliding space is provided in a main body, and the sliding part slides in the sliding space; the inserting part is disposed at one end of the sliding part, and the elastic member resists to the other end of the sliding part; and when the objective lens rotates to the mounting position, the elastic member pushes the sliding part, so that the inserting part is inserted into the locking hole.

As the improvement of the present disclosure, a sliding slot is formed in a surface of the main body, the sliding slot communicates to the sliding space, a shifting part is convexly disposed on a surface of the sliding part, and the shifting part is arranged in a manner of threading out of the sliding slot.

As the improvement of the present disclosure, an edge of the sliding slot is provided with a finger slot, which is used to allow finger insertion.

As the improvement of the present disclosure, the shifting part is provided with an inclined friction surface, and one side, closing to an inserting part, of the friction surface resists to one side closing to an elastic member.

As the improvement of the present disclosure, a mounting base is provided with a moving window, and at least part of an outer surface of the objective lens is provided with friction stripes; and when the objective lens is inserted into the mounting base, the friction stripes correspond to the moving window, and the moving window is used to allow a user to translate or rotate the objective lens.

As the improvement of the present disclosure, the objective lens is provided with a first sealing slot, and a first sealing ring is disposed in the first sealing slot; and when the objective lens is inserted into the mounting base, an inner side of the first sealing ring resists to an inner wall of the first sealing slot, and an outer side of the first sealing ring resists to an inner wall of the mounting base.

As the improvement of the present disclosure, an inner wall of the mounting base is provided with a second sealing slot, and a second sealing ring is disposed in the second sealing slot; and when the objective lens is inserted into the mounting base, an inner side of the second sealing ring resists to an inner wall of the second sealing slot, and an outer side of the second sealing ring resists to an edge of the objective lens.

The present disclosure also provides night vision binoculars with replaceable objective lens comprising: a main body, which is provided with a mounting base; an objective lens, which is detachably inserted into the mounting base, and the objective lens is configured to rotate relative to the mounting base; and a locking member, which is slidingly disposed on the main body and provided with a locking position and an unlocking position; when the locking member is in the locking position, the locking member is inserted into the objective lens; and when the locking member is in the unlocking position, the objective lens moves in relative to the mounting base.

As the improvement of the present disclosure, the objective lens is provided with a sliding rail and a plug-in opening, the plug-in opening communicates with the sliding rail, the mounting base is provided with a limiting bump, the limiting bump is inserted into the sliding rail along the plug-in opening and slides in the sliding rail, and the limiting bump resists to a side wall of the sliding rail.

As the improvement of the present disclosure, the objective lens is provided with an inserting position and a mounting position; when the objective lens is in the inserting position, the limiting bump is inserted or pulled out along the plug-in opening; and when the objective lens rotates to the mounting position, the limiting bump resists to the side wall of the sliding rail, a locking member is located in a locking position, and the locking member is inserted into a locking hole.

As the improvement of the present disclosure, the locking member comprises an inserting part, a sliding part and an elastic member; a sliding space is provided in a main body, and the sliding part slides in the sliding space; the inserting part is disposed at one end of the sliding part, and the elastic member resists to the other end of the sliding part; and when the objective lens rotates to the mounting position, the elastic member pushes the sliding part, so that the inserting part is inserted into the locking hole.

As the improvement of the present disclosure, a sliding slot is formed in a surface of the main body, the sliding slot communicates to the sliding space, a shifting part is convexly disposed on a surface of the sliding part, and the shifting part is arranged in a manner of threading out of the sliding slot.

As the improvement of the present disclosure, an edge of the sliding slot is provided with a finger slot, which is used to allow finger insertion.

As the improvement of the present disclosure, the shifting part is provided with an inclined friction surface, and one side, closing to an inserting part, of the friction surface resists to one side closing to an elastic member.

As the improvement of the present disclosure, a mounting base is provided with a moving window, and at least part of an outer surface of the objective lens is provided with friction stripes; and when the objective lens is inserted into the mounting base, the friction stripes correspond to the moving window, and the moving window is used to allow a user to translate or rotate the objective lens.

As the improvement of the present disclosure, the objective lens is provided with a first sealing slot, and a first sealing ring is disposed in the first sealing slot; and when the objective lens is inserted into the mounting base, an inner side of the first sealing ring resists to an inner wall of the first sealing slot, and an outer side of the first sealing ring resists to an inner wall of the mounting base.

As the improvement of the present disclosure, an inner wall of the mounting base is provided with a second sealing slot, and a second sealing ring is disposed in the second sealing slot; and when the objective lens is inserted into the mounting base, an inner side of the second sealing ring resists to an inner wall of the second sealing slot, and an outer side of the second sealing ring resists to an edge of the objective lens.

Beneficial effects: through the above structure setting, when the objective lens is installed, the objective lens is inserted along the mounting base, and the objective lens is adjusted to the mounting position. At this time, the locking member is inserted into the locking hole, so as to fix the objective lens effectively, and then a user is convenient to install the objective lens; when disassembling the objective lens, the locking member is moved to the unlocking position and separated from the locking hole, at this time the objective lens may move in relative to the mounting base, and the user is convenient to disassemble the objective lens; and the objective lens is simple in structure, convenient to use and reasonable in design.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
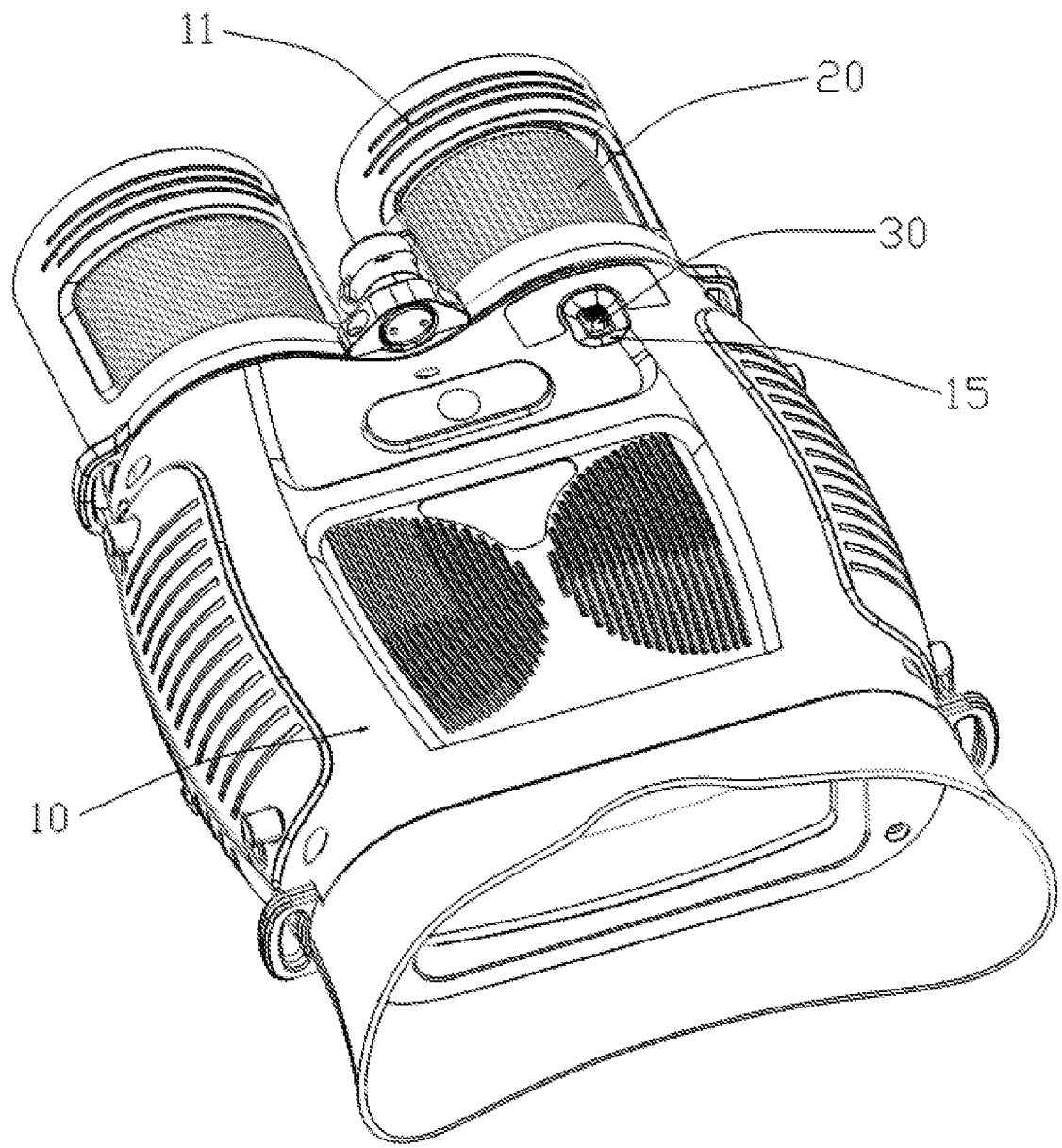
FIG. 1 is a schematic diagram of an overall structure of the present disclosure.
Figure 2:
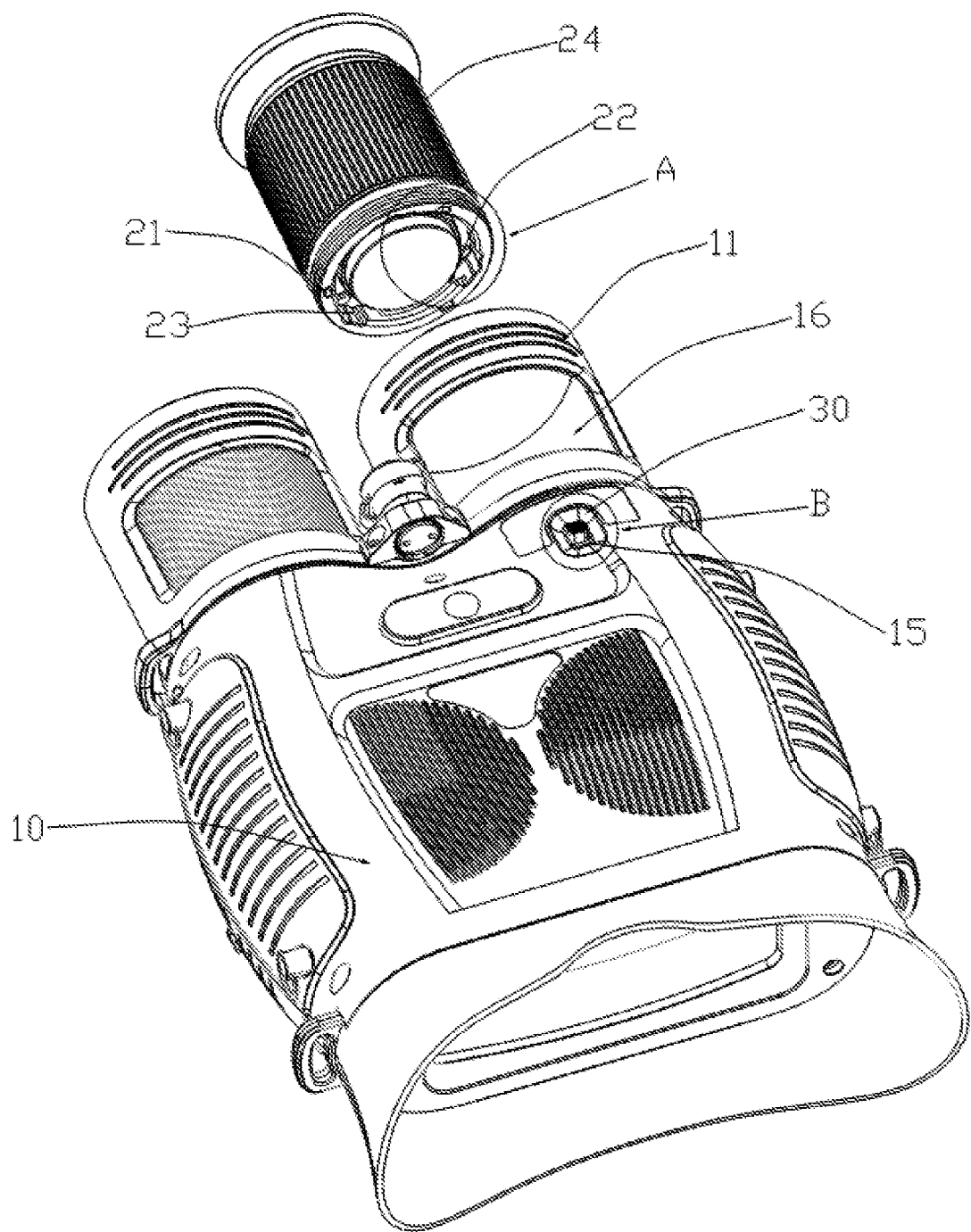
FIG. 2 is a schematic diagram of an exploded structure in an angle of the present disclosure.
Figure 3:
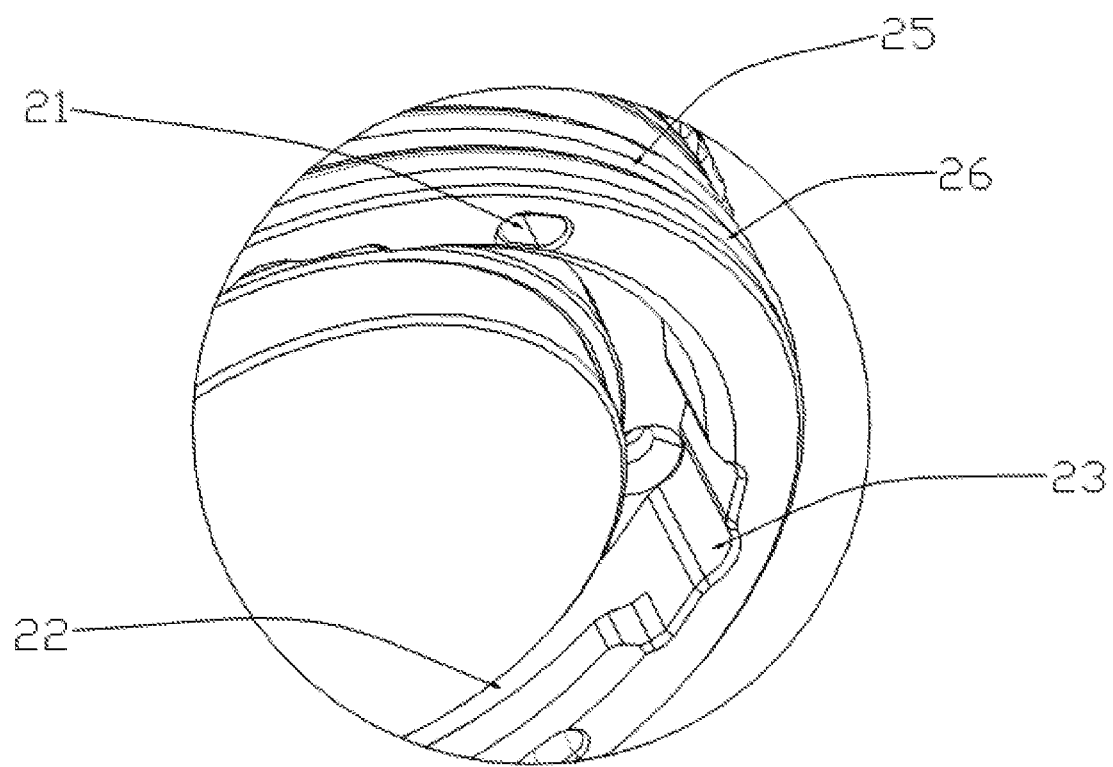
FIG. 3 is an enlarged view of a part A in FIG. 2.
Figure 4:
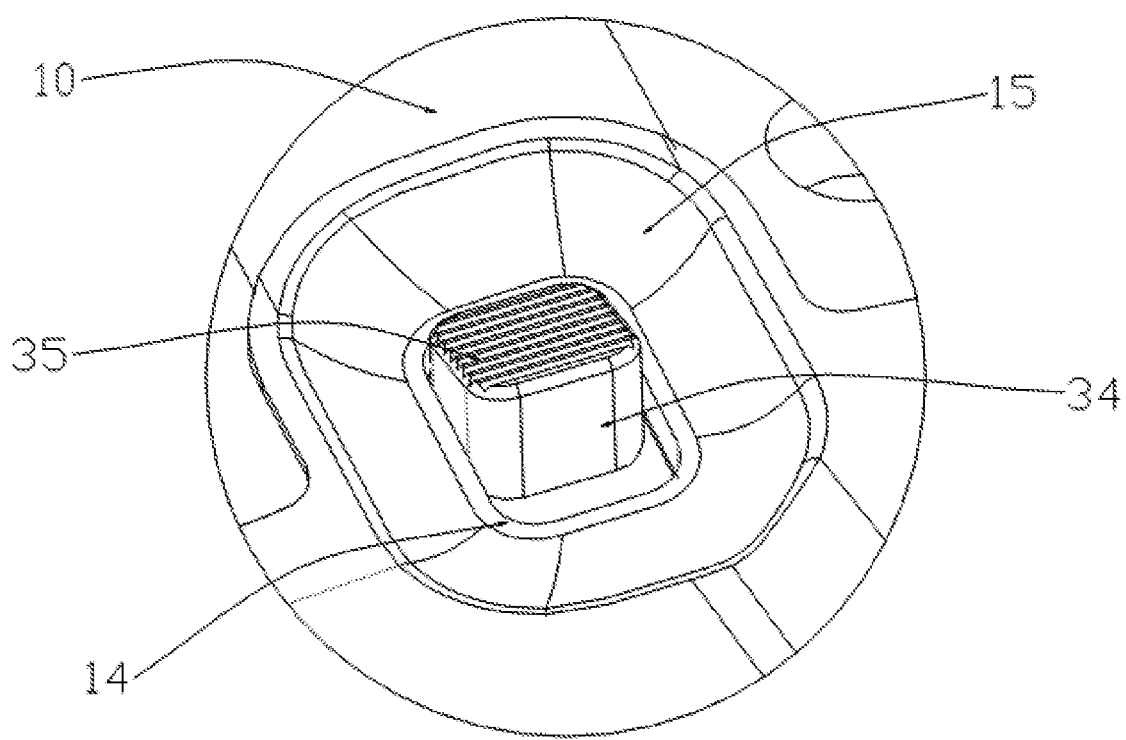
FIG. 4 is an enlarged view of a part B in FIG. 2.
Figure 5:
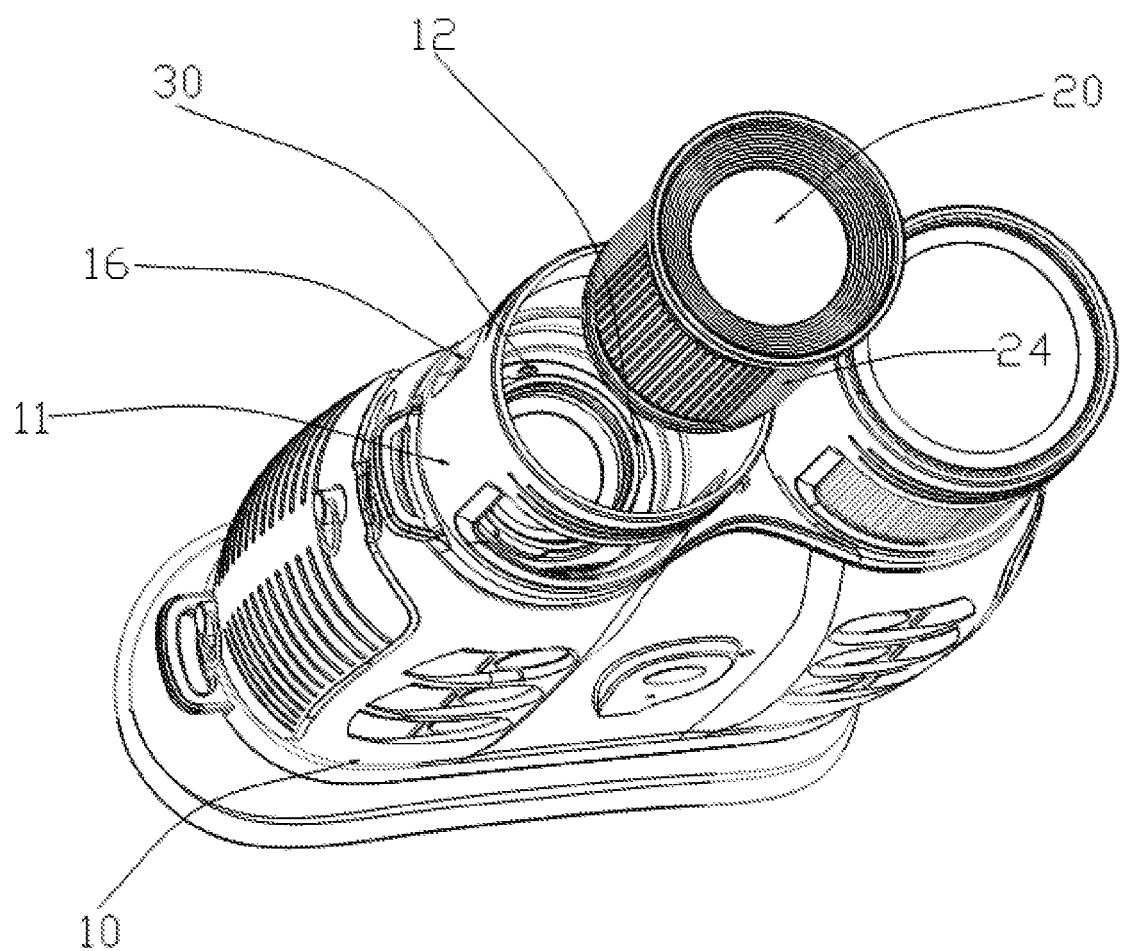
FIG. 5 is a schematic diagram of an exploded structure in another angle of the present disclosure.
Figure 6:
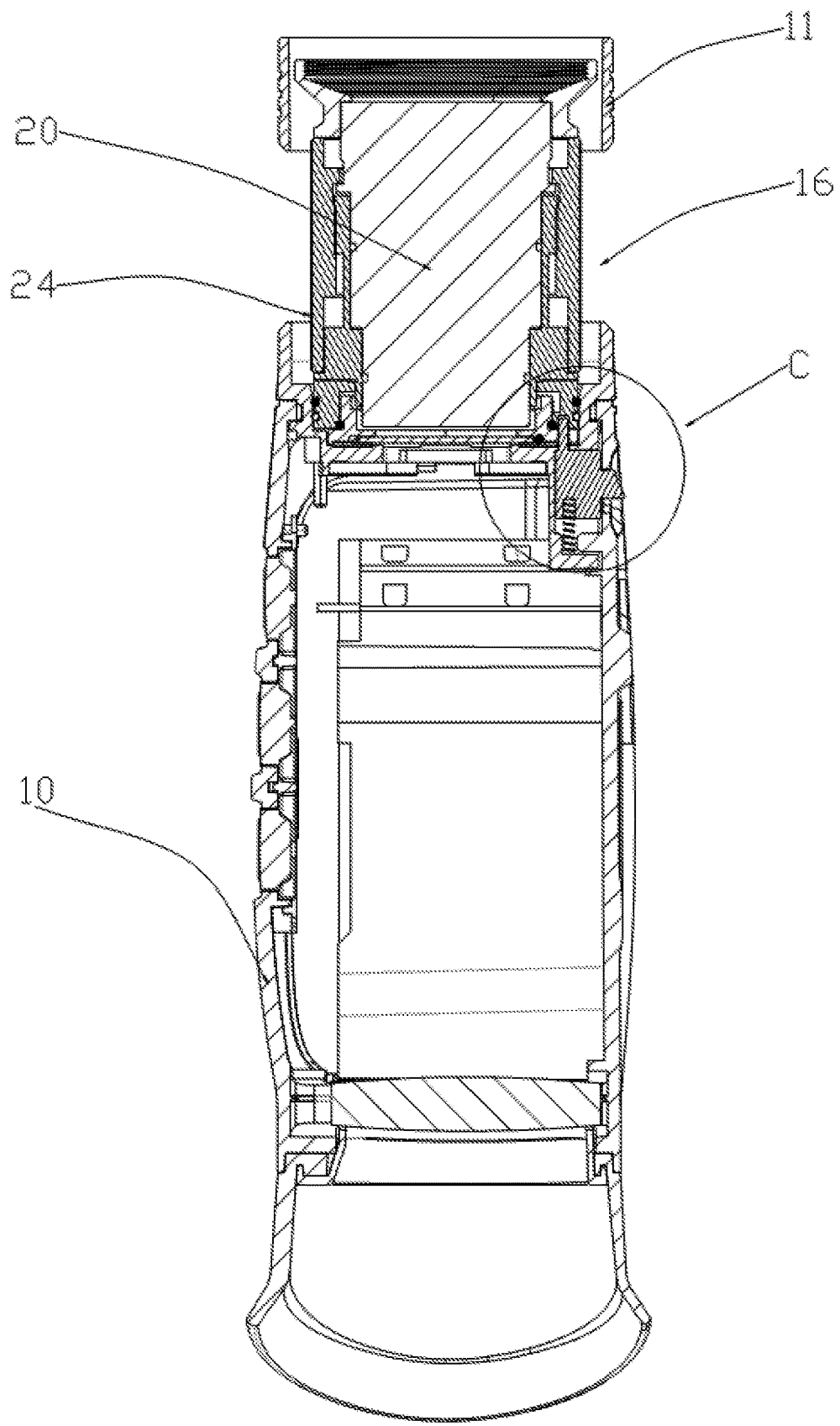
FIG. 6 is a sectional view when a locking member of night vision binoculars of the present disclosure is in a locking position.
Figure 7:
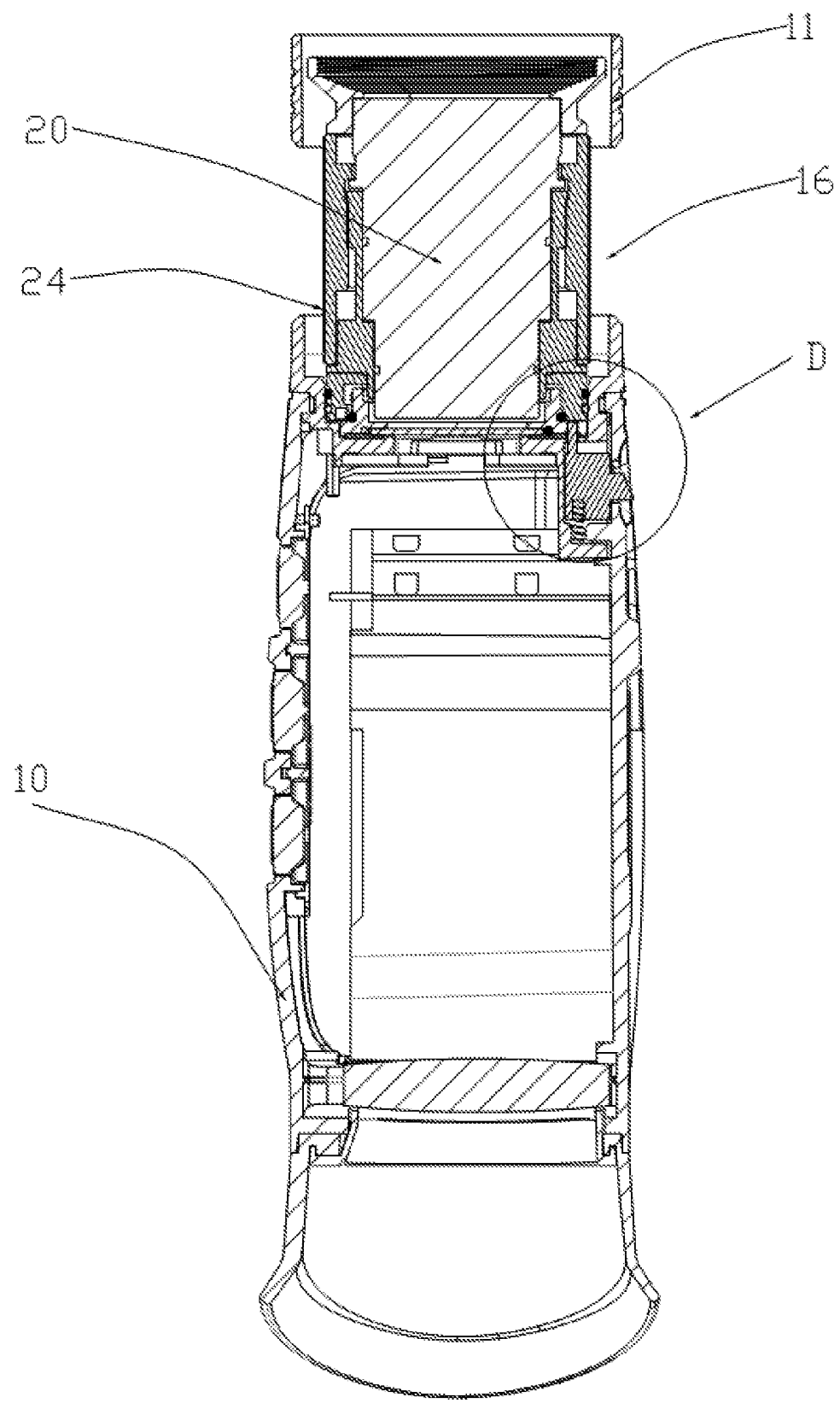
FIG. 7 is a sectional view when a locking member of night vision binoculars of the present disclosure is in an unlocking position.
Figure 8:
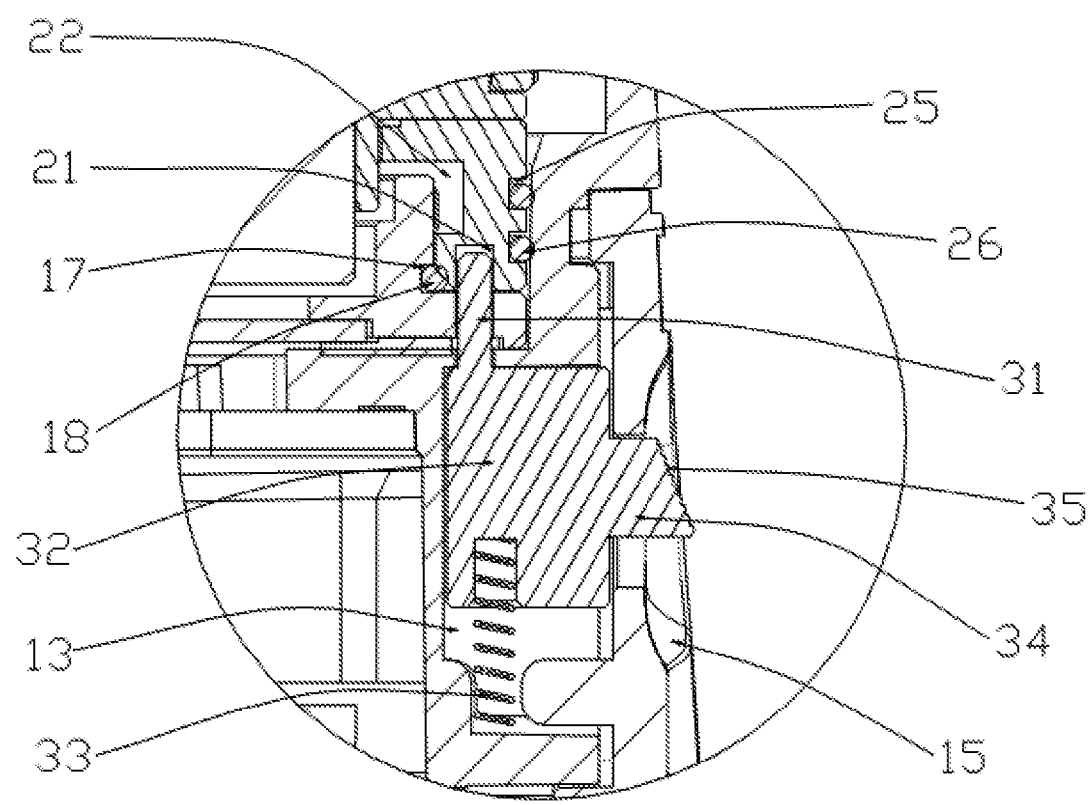
FIG. 8 is an enlarged view of a part C in FIG. 6.
Figure 9:
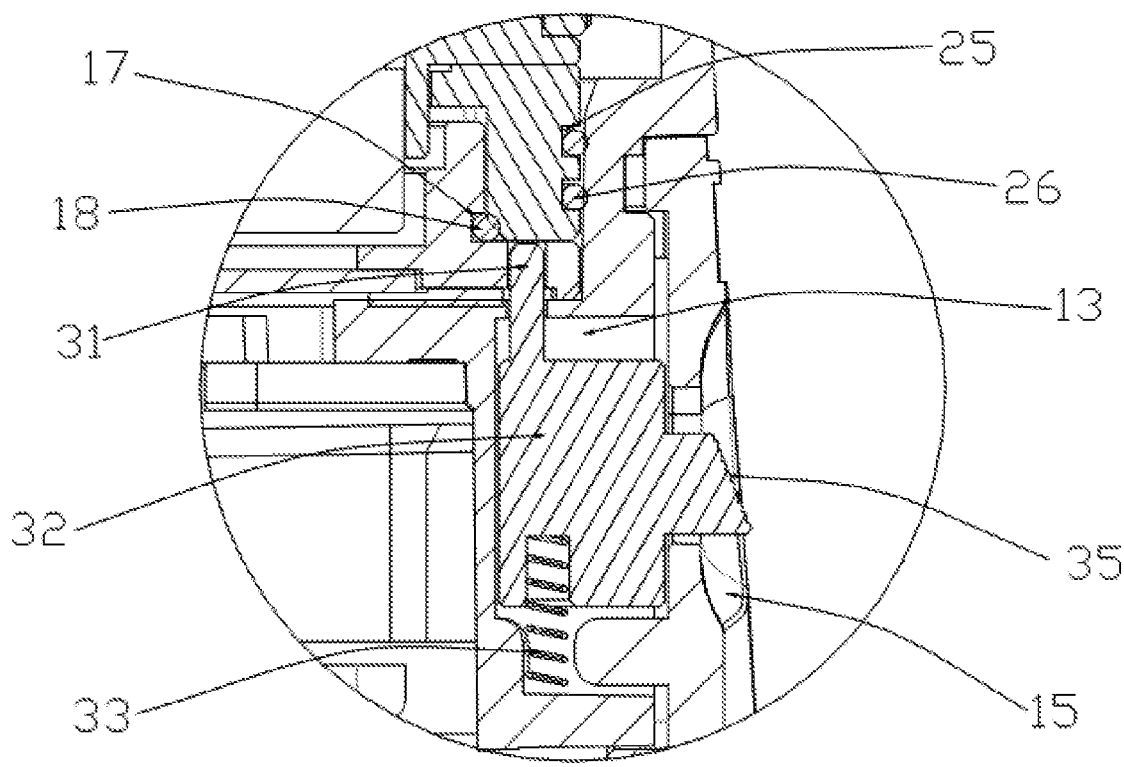
FIG. 9 is an enlarged view of a part D in FIG. 7.
Figure 10:
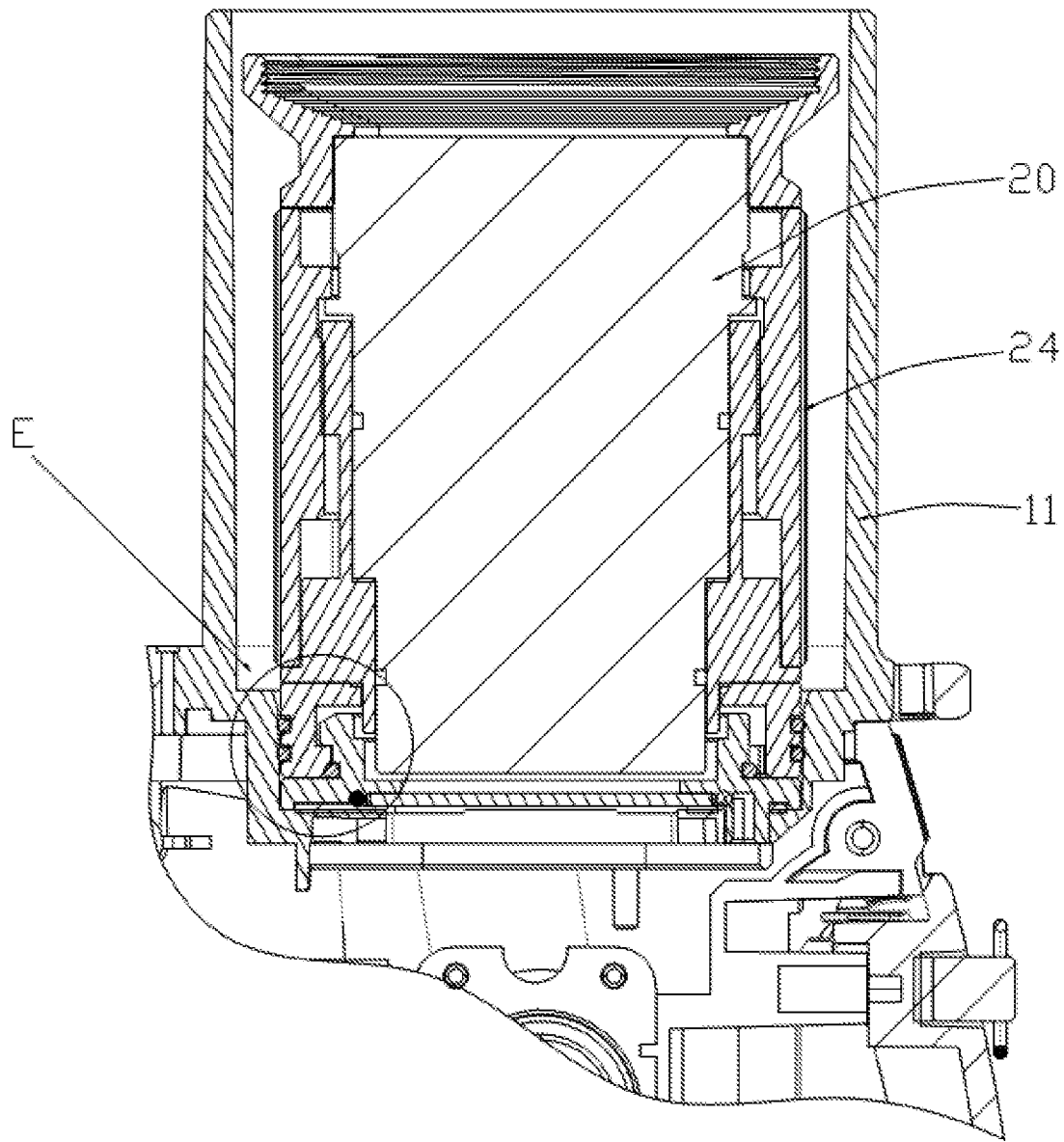
FIG. 10 is a sectional view of a partial structure when an objective lens of night vision binoculars of the present disclosure is in a mounting position.
Figure 11:
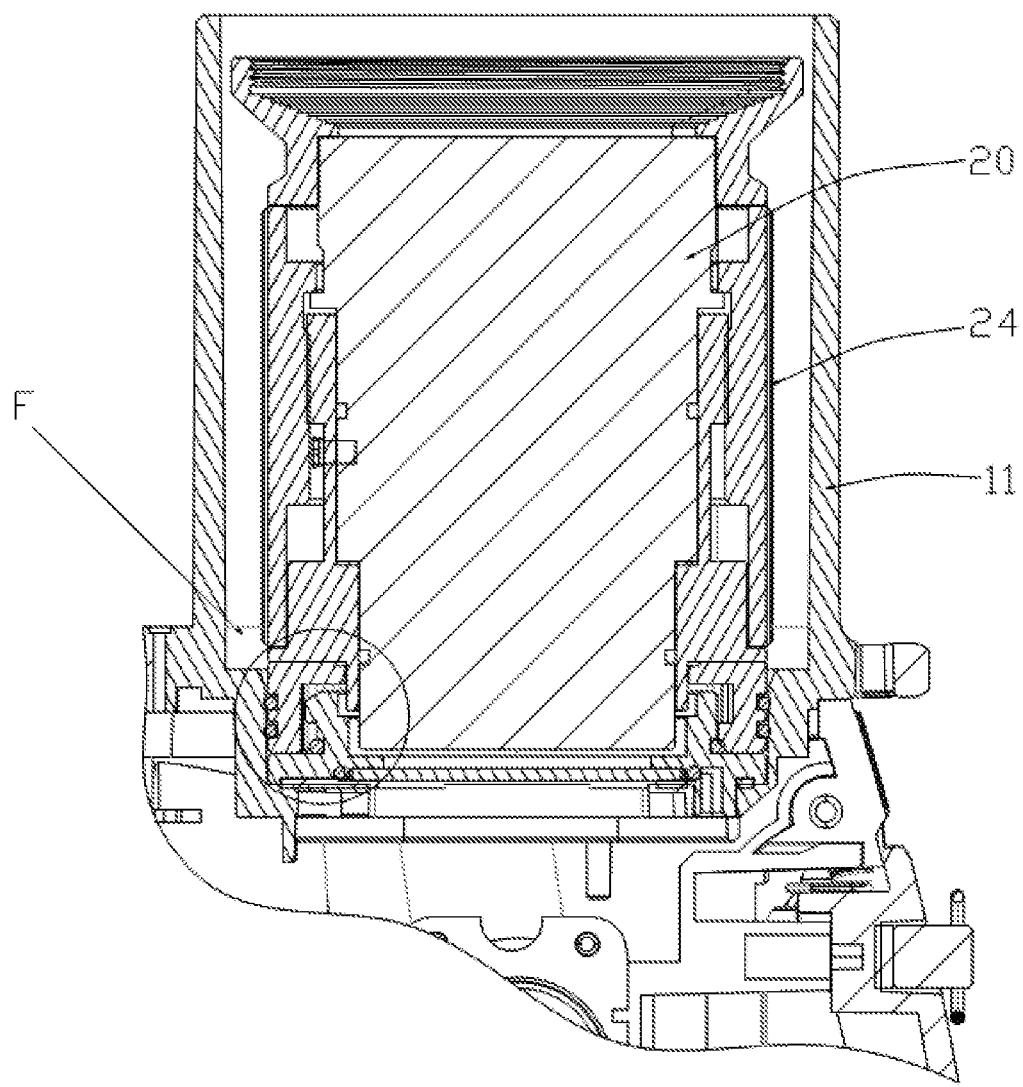
FIG. 11 is a sectional view of a partial structure when an objective lens of night vision binoculars of the present disclosure is in an inserting position.
Figure 12:
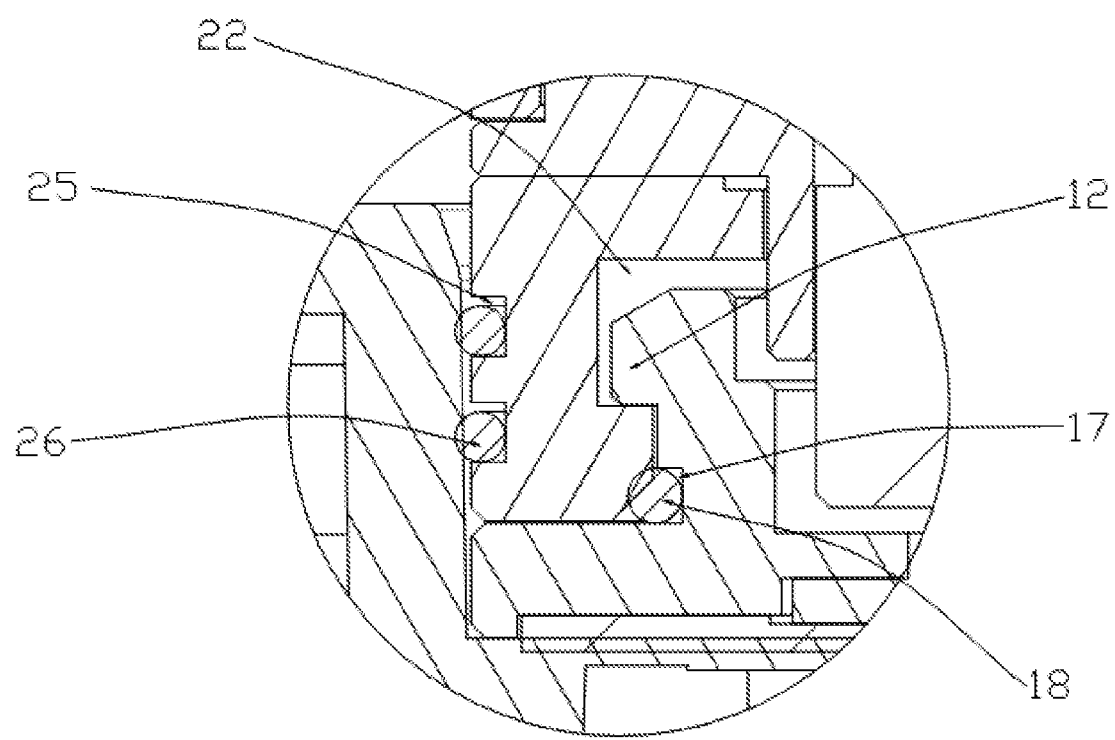
FIG. 12 is an enlarged view of a part E in FIG. 10.
Figure 13:
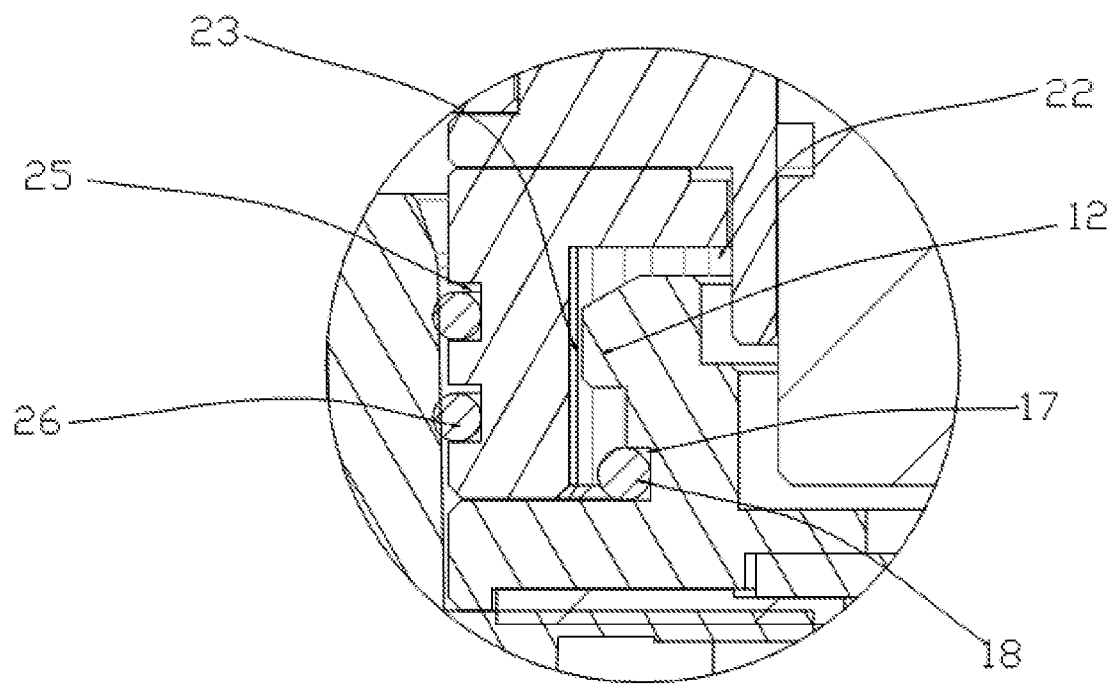
FIG. 13 is an enlarged view of a part F in FIG. 11.

Referring to FIG. 1 to FIG. 3, night vision binoculars with a replaceable objective lens includes:

a main body 10, which is provided with a mounting base 11;

an objective lens 20, which is provided with a locking hole 21 and may be detachably inserted into the mounting base 11, and the objective lens 20 rotates in the mounting base; and a locking member 30, which may be slidingly disposed on the main body 10 and provided with a locking position and an unlocking position; when the locking member 30 is in the locking position, the locking member 30 is inserted into the locking hole 21; and when the locking member 30 is in the unlocking position, the objective lens 20 may move in relative to the mounting base 11.

Through the above structure setting, when the objective lens is installed, the objective lens is inserted along the mounting base, and the objective lens is adjusted to the mounting position. At this time, the locking member is inserted into the locking hole, so as to fix the objective lens effectively, and then a user is convenient to install the objective lens; when disassembling the objective lens, the locking member is moved to the unlocking position and separated from the locking hole, at this time the objective lens may move in relative to the mounting base, and the user is convenient to disassemble the objective lens; and the objective lens is simple in structure, convenient to use and reasonable in design.

In this embodiment, the objective lens 20 is provided with a sliding rail 22 and a plug-in opening 23, the plug-in opening 23 communicates with the sliding rail 22, the mounting base 11 is provided with a limiting bump 12, the limiting bump 12 may be inserted into the sliding rail 22 along the plug-in opening 23 and slide in the sliding rail 22, and the limiting bump 12 resists to a side wall of the sliding rail 22. Through the above structure setting, when installing the objective lens, the limiting bump is inserted into the sliding rail along the plug-in opening, the objective lens rotates so that the limiting bump slides in the sliding rail; at this time, the limiting bump resists to the inner wall of the sliding rail so as to prevent the objective lens from falling, and the user is convenient to install the objective lens; and the objective lens rotates to the mounting position, at this time the locking member is towards the locking hole and inserted into the locking hole, so the objective lens is fixed further, thereby preventing the objective lens from rotating in relative to the mounting base, and enhancing the product stability. When disassembling the objective lens, the locking member is separated from the locking hole, and the objective lens is rotated, so that the limiting bump is towards the plug-in opening; and the limiting bump is pulled out along the plug-in opening, so the user is convenient to disassemble and replace the objective lens, the product adaptability is improved, and the user is also convenient to maintain and clean the objective lens.

In this embodiment, the objective lens 20 is provided with an inserting position and a mounting position; when the objective lens 20 is in the inserting position, the limiting bump 12 may be inserted or pulled out along the plug-in opening 23; and when the objective lens 20 rotates to the mounting position, the limiting bump 12 resists to the side wall of the sliding rail 22, the locking member 30 is located in the locking position, and the locking member 30 is inserted into the locking hole 21. Through the above structure setting, the objective lens may rotate in relative to the mounting base, when the objective lens rotates to the inserting position, the limiting bump is towards to the plug-in opening and may be inserted or pulled out along the plug-in opening; the objective lens is rotated, at this time the limiting bump slides in the sliding rail and resists to the inner wall of the sliding rail; the objective lens is rotated to the mounting position, the locking member is inserted into the locking hole, so the relative rotation between the objective lens and the mounting base is limited, and the objective lens is convenient to use; a plurality of limiting bumps may be provided and uniformly disposed in the mounting base, correspondingly, a plurality of plug-in openings are provided, and the quantity and the relative positions of the plug-in openings correspond to those of the limiting bumps; preferably, three limiting bumps may be provided and uniformly disposed on an outer surface of the objective lens, correspondingly, three plug-in openings are also provided, the positions of the plug-in openings correspond to those of the limiting bumps; during use and rotation, the three limiting bumps all correspond to the three plug-in opening in respective, the rotation stroke that the user rotates the objective lens is reduced, so the user is convenient to align the limiting bumps with the plug-in openings, the limiting bumps may correspond to the plug-in openings in a plurality of positions, and the user is convenient to assemble the objective lens.

In this embodiment, the locking member 30 includes an inserting part 31, a sliding part 32 and an elastic member 33; a sliding space 13 is provided in the main body 10, and the sliding part 32 slides in the sliding space 13; the inserting part 31 is disposed at one end of the sliding part 32, and the elastic member 33 resists to the other end of the sliding part 32; and when the objective lens 20 rotates to the mounting position, the elastic member 33 pushes the sliding part 32, so that the inserting part 31 is inserted into the locking hole 21. Through the above structure setting, during use, when the objective lens is rotated to the inserting position, the limiting bump is inserted along the plug-in opening, at this time a bottom wall of the objective lens resists to the inserting part, and a spring compresses and deforms; and the objective lens is rotated to the mounting position, at this time the locking hole is towards the inserting part, the spring resets and pushes the sliding part and the inserting part, and the inserting part is inserted into the locking hole, so as to effectively limit the relative rotation between the objective lens and the mounting base. The convenient installation of the eyepiece may be implemented through the deformation and reset of the spring, and the user does not need to adjust the locking member during the installation process of the objective lens, and the objective lens is convenient to use.

In this embodiment, a sliding slot 14 is formed in a surface of the main body 10, the sliding slot 14 communicates to the sliding space 13, a shifting part 34 is convexly disposed on a surface of the sliding part 32, and the shifting part 34 is arranged in a manner of threading out of the sliding slot 14. Through the above structure setting, during use, the shifting part threads out of the sliding slot, so the user may contact with the shifting part directly and be convenient to adjust the locking member; when disassembling the objective lens, the shifting part is pulled, so that the inserting part is separated from the locking hole, the objective lens is rotated to the inserting position, the limiting bump is pulled along the plug-in opening, that is, the disassembly of the objective lens may be implemented, the user is convenient to use the objective lens, and the using experience of the user is improved.

In this embodiment, an edge of the sliding slot 14 is provided with a finger slot 15, which is used to allow finger insertion. Through the above structure setting, during use, the finger slot is arranged along the edge of the sliding slot, so that the user may be convenient to insert fingers along the finger slot, the shifting part is pulled for convenient use of the user, and the using experience of the user is improved.

In this embodiment, the shifting part 34 is provided with an inclined friction surface 35, and one side, closing to the inserting part 31, of the friction surface 35 resists to one side closing to the elastic member 33. Through the above structure setting, during use, the setting of the friction surface may improve frictional force between the user fingers and the shifting part, and the user is more convenient to adjust the shifting part; and however the friction surface is obliquely arranged, so the user is convenient to pull the shifting part downwards, and the user may apply force better to separate the inserting part from the locking hole.

In this embodiment, the mounting base 11 is provided with a moving window 16, and at least part of an outer surface of the objective lens 20 is provided with friction stripes 24; and when the objective lens 20 is inserted into the mounting base 11, the friction stripes 24 correspond to the moving window 16, and the moving window 16 is used to allow the user to translate or rotate the objective lens 20. Through the above structure setting, during use, when the objective lens is inserted into the mounting base or the objective lens rotates in the mounting base, the user fingers may pass through the moving window and contact with the friction stripes directly, so that the user is convenient to adjust and use the objective lens, with a better using effect.

In this embodiment, the objective lens 20 is provided with a first sealing slot 25, and a first sealing ring 26 is disposed in the first sealing slot 25; and when the objective lens 20 is inserted into the mounting base 11, an inner side of the first sealing ring 26 resists to an inner wall of the first sealing slot 25, and an outer side of the first sealing ring 26 resists to an inner wall of the mounting base 11. Through the above structure setting, when the objective lens is inserted into the mounting base, the first sealing ring implements the sealing between the objective lens and the mounting base, so as to prevent external dust, water and other impurities from entering inside the night vision binoculars along a gap between the objective lens and the mounting base, and then the product stability is ensured; preferentially, two adjacent first sealing rings may be arranged at intervals, correspondingly, two first sealing slots are arranged on an outer surface of the objective lens, the two first sealing rings are respectively arranged in the two first sealing slots, so as to further improve the product sealing, ensure the product stability and prolong the service life of the product.

In this embodiment, an inner wall of the mounting base 11 is provided with a second sealing slot 17, and a second sealing ring 18 is disposed in the second sealing slot 17; and when the objective lens 20 is inserted into the mounting base 11, an inner side of the second sealing ring 18 resists to an inner wall of the second sealing slot 17, and an outer side of the second sealing ring 18 resists to an edge of the objective lens 20. Through the above structure setting, the second sealing ring is arranged at a lower side of the limiting bump; and when the objective lens is inserted into the mounting base, an edge of the sliding rail on the objective lens resists to an outer side of the second sealing ring, and an inner side of the second sealing ring resists to the inner wall of the second sealing slot, so as to further enhance the product sealing and improve the product stability.

In this embodiment, the main body further includes an isolation lens, which is hermetically connected to the mounting base. Through the above structure setting, the isolation lens is hermetically installed on the mounting base, so as to effectively isolate an interior from an exterior of the mounting base, and to protect the internal structure of the product. Preferably, the isolation lens is a dustproof and waterproof lens, which can prevent dust, water and other impurities from entering inside the night vision binoculars, effectively protect components inside the night vision binoculars, improve the product stability and prolong the service life of the product.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. Night vision binoculars with a replaceable objective lens, comprising:
    a main body, which is provided with a mounting base;
    an objective lens, which is provided with a locking hole and detachably inserted into the mounting base, and the objective lens rotates in the mounting base; and
    a locking member, which is slidingly disposed on the main body and provided with a locking position and an unlocking position; when the locking member is in the locking position, the locking member is inserted into the locking hole; and when the locking member is in the unlocking position, the objective lens moves in relative to the mounting base,
    wherein the objective lens is provided with a sliding rail and a plug-in opening, the plug-in opening communicates with the sliding rail, the mounting base is provided with a limiting bump, the limiting bump is inserted into the sliding rail along the plug-in opening and slides in the sliding rail, and the limiting bump resists to a side wall of the sliding rail.

2. The night vision binoculars with the replaceable objective lens according to claim 1, wherein the objective lens is provided with an inserting position and a mounting position; when the objective lens is in the inserting position, the limiting bump is inserted or pulled out along the plug-in opening; and when the objective lens rotates to the mounting position, the limiting bump resists to the side wall of the sliding rail, a locking member is located in a locking position, and the locking member is inserted into the locking hole.

3. The night vision binoculars with the replaceable objective lens according to claim 2, wherein the locking member comprises an inserting part, a sliding part and an elastic member; a sliding space is provided in a main body, and the sliding part slides in the sliding space; the inserting part is disposed at one end of the sliding part, and the elastic member resists to the other end of the sliding part; and when the objective lens rotates to the mounting position, the elastic member pushes the sliding part, so that the inserting part is inserted into the locking hole.

4. The night vision binoculars with the replaceable objective lens according to claim 3, wherein a sliding slot is formed in a surface of the main body, the sliding slot communicates to the sliding space, a shifting part is convexly disposed on a surface of the sliding part, and the shifting part is arranged in a manner of threading out of the sliding slot.

5. The night vision binoculars with the replaceable objective lens according to claim 4, wherein an edge of the sliding slot is provided with a finger slot, which is used to allow finger insertion.

6. The night vision binoculars with the replaceable objective lens according to claim 4, wherein the shifting part is provided with an inclined friction surface, and one side, closing to an inserting part, of the friction surface resists to one side closing to an elastic member.

7. The night vision binoculars with the replaceable objective lens according to claim 4, wherein a mounting base is provided with a moving window, and at least part of an outer surface of the objective lens is provided with friction stripes; and when the objective lens is inserted into the mounting base, the friction stripes correspond to the moving window, and the moving window is used to allow a user to translate or rotate the objective lens.

8. The night vision binoculars with the replaceable objective lens according to claim 1, wherein the objective lens is provided with a first sealing slot, and a first sealing ring is disposed in the first sealing slot; and when the objective lens is inserted into the mounting base, an inner side of the first sealing ring resists to an inner wall of the first sealing slot, and an outer side of the first sealing ring resists to an inner wall of the mounting base.

9. The night vision binoculars with the replaceable objective lens according to claim 8, wherein an inner wall of the mounting base is provided with a second sealing slot, and a second sealing ring is disposed in the second sealing slot; and when the objective lens is inserted into the mounting base, an inner side of the second sealing ring resists to an inner wall of the second sealing slot, and an outer side of the second sealing ring resists to an edge of the objective lens.

10. Night vision binoculars with a replaceable objective lens, comprising:
   a main body, which is provided with a mounting base;
   an objective lens, which is detachably inserted into the mounting base, and the objective lens is configured to rotate relative to the mounting base; and
   a locking member, which is slidingly disposed on the main body and provided with a locking position and an unlocking position; when the locking member is in the locking position, the locking member is inserted into the objective lens; and when the locking member is in the unlocking position, the objective lens moves in relative to the mounting base,
   wherein the objective lens is provided with a first sealing slot, and a first sealing ring is disposed in the first sealing slot; and when the objective lens is inserted into the mounting base, an inner side of the first sealing ring resists to an inner wall of the first sealing slot, and an outer side of the first sealing ring resists to an inner wall of the mounting base.

11. The night vision binoculars with the replaceable objective lens according to claim 10, wherein the objective lens is provided with a sliding rail and a plug-in opening, the plug-in opening communicates with the sliding rail, the mounting base is provided with a limiting bump, the limiting bump is inserted into the sliding rail along the plug-in opening and slides in the sliding rail, and the limiting bump resists to a side wall of the sliding rail.

12. The night vision binoculars with the replaceable objective lens according to claim 11, wherein the objective lens is provided with an inserting position and a mounting position; when the objective lens is in the inserting position, the limiting bump is inserted or pulled out along the plug-in opening; and when the objective lens rotates to the mounting position, the limiting bump resists to the side wall of the sliding rail, a locking member is located in a locking position, and the locking member is inserted into a locking hole.

13. The night vision binoculars with the replaceable objective lens according to claim 12, wherein the locking member comprises an inserting part, a sliding part and an elastic member; a sliding space is provided in a main body, and the sliding part slides in the sliding space; the inserting part is disposed at one end of the sliding part, and the elastic member resists to the other end of the sliding part; and when the objective lens rotates to the mounting position, the elastic member pushes the sliding part, so that the inserting part is inserted into the locking hole.

14. The night vision binoculars with the replaceable objective lens according to claim 13, wherein a sliding slot is formed in a surface of the main body, the sliding slot communicates to the sliding space, a shifting part is convexly disposed on a surface of the sliding part, and the shifting part is arranged in a manner of threading out of the sliding slot.

15. The night vision binoculars with the replaceable objective lens according to claim 14, wherein an edge of the sliding slot is provided with a finger slot, which is used to allow finger insertion.

16. The night vision binoculars with the replaceable objective lens according to claim 14, wherein the shifting part is provided with an inclined friction surface, and one side, closing to an inserting part, of the friction surface resists to one side closing to an elastic member.

17. The night vision binoculars with the replaceable objective lens according to claim 14, wherein a mounting base is provided with a moving window, and at least part of an outer surface of the objective lens is provided with friction stripes;
   and when the objective lens is inserted into the mounting base, the friction stripes correspond to the moving window, and the moving window is used to allow a user to translate or rotate the objective lens.

18. The night vision binoculars with the replaceable objective lens according to claim 1, wherein an inner wall of the mounting base is provided with a second sealing slot, and a second sealing ring is disposed in the second sealing slot; and when the objective lens is inserted into the mounting base, an inner side of the second sealing ring resists to an inner wall of the second sealing slot, and an outer side of the second sealing ring resists to an edge of the objective lens.

19. Night vision binoculars with a replaceable objective lens, comprising:
   a main body, which is provided with a mounting base;
   an objective lens, which is detachably inserted into the mounting base, and the objective lens is configured to rotate relative to the mounting base; and
   a locking member, which is slidingly disposed on the main body and provided with a locking position and an unlocking position; when the locking member is in the locking position, the locking member is inserted into the objective lens; and when the locking member is in the unlocking position, the objective lens moves in relative to the mounting base,
   wherein an inner wall of the mounting base is provided with a sealing slot, and a sealing ring is disposed in the sealing slot; and when the objective lens is inserted into the mounting base, an inner side of the sealing ring resists to an inner wall of the sealing slot, and an outer side of the sealing ring resists to an edge of the objective lens.

\* \* \* \* \*